US 12,138,696 B2

(12) United States Patent
Uenishi et al.

(10) Patent No.: US 12,138,696 B2
(45) Date of Patent: Nov. 12, 2024

(54) WORKPIECE MACHINING METHOD

(71) Applicant: FANUC CORPORATION, Yamanashi (JP)

(72) Inventors: Daisuke Uenishi, Yamanashi (JP); Tomohiro Oyamada, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 264 days.

(21) Appl. No.: 17/790,685

(22) PCT Filed: Jan. 18, 2021

(86) PCT No.: PCT/JP2021/001481
§ 371 (c)(1),
(2) Date: Jul. 1, 2022

(87) PCT Pub. No.: WO2021/149638
PCT Pub. Date: Jul. 29, 2021

(65) Prior Publication Data
US 2023/0044441 A1 Feb. 9, 2023

(30) Foreign Application Priority Data
Jan. 23, 2020 (JP) ................................ 2020-008985

(51) Int. Cl.
B23Q 1/48 (2006.01)
B23C 3/18 (2006.01)
(Continued)

(52) U.S. Cl.
CPC .................. B23C 3/18 (2013.01); B23Q 1/48 (2013.01); B23Q 1/4857 (2013.01);
(Continued)

(58) Field of Classification Search
CPC .......... B23C 3/18; B23Q 1/48; B23Q 1/4857; B23Q 1/5406; B23Q 1/5412; B23Q 1/623; B23Q 1/488
See application file for complete search history.

(56) References Cited

U.S. PATENT DOCUMENTS 5,067,284 A 11/1991 Putnam et al.

FOREIGN PATENT DOCUMENTS

CN 110548908 A 12/2019
EP 2425921 A2 3/2012
(Continued)

OTHER PUBLICATIONS

English translation and for JP2007229849A (Year: 2007).*
International Search Report issued in PCT/JP2021/001481; mailed Feb. 16, 2021.

Primary Examiner — Jason L Vaughan
Assistant Examiner — Amanda Kreiling
(74) Attorney, Agent, or Firm — Studebaker & Brackett PC

(57) ABSTRACT

The purpose of the present invention is to improve the machined-surface quality of a curved surface of a workpiece without reducing the machining speed when the curved surface is subjected to removal machining. Provided is a workpiece machining method in which a rotating table on which a workpiece is placed and a tool are relatively moved along two linear movement axes orthogonal to each other, the workpiece is rotated about each of a first turning axis and a second turning axis orthogonal to each other by the rotating table, and at least one curved surface of a protruding curved surface and a recessed curved surface is subjected to removal machining. The method includes: disposing the first turning axis so as to be parallel to a first linear movement axis of the two linear movement axes, the motor load during linear movement in the first linear movement axis being (Continued)

relatively small; disposing the second turning axis on a plane perpendicular to the first linear movement axis; and subjecting the curved surface to removal machining along the direction of curvature while moving the workpiece along the first linear movement axis and rotating the workpiece about the second turning axis.

5 Claims, 7 Drawing Sheets

(51) Int. Cl.
     *B23Q 1/54*         (2006.01)
     *B23Q 1/62*         (2006.01)

(52) U.S. Cl.
     CPC ......... *B23Q 1/5406* (2013.01); *B23Q 1/5412* (2013.01); *B23Q 1/623* (2013.01)

(56) References Cited

FOREIGN PATENT DOCUMENTS

| | | |
|---|---|---|
| JP | 2005-074568 A | 3/2005 |
| JP | 2007-229849 A | 9/2007 |
| JP | 2016-036869 A | 3/2016 |
| JP | 2019-503878 A | 2/2019 |
| WO | 2013/150905 A1 | 10/2013 |
| WO | 2015/114811 A1 | 8/2015 |

* cited by examiner

WORKPIECE MACHINING METHOD

TECHNICAL FIELD

The present invention relates to a workpiece machining method.

BACKGROUND ART

In machining of a blade component such as a turbine blade employed for a jet engine, a cutting machine having a rotation axis, such as a five-axis machining center, is used. Generally, the blade component is in a thin plate shape, and as a blade surface, has at least one curved surface selected from a convex surface or a concave surface.

In machining of the blade component by the cutting machine, rough machining with a miller, semi-finishing with a radius end mill, and finishing with a ball end mill are mainly employed. For the thin low-rigidity shape of the blade component, high-efficiency removal machining for carving the blade component from a workpiece (a base material) all at once by means of, e.g., a tapered ball end mill or a ball end mill is employed. Removal machining is performed in such a manner that a tool axis is set on an outer circumference of a machined shape in a section perpendicular to a longitudinal axis direction of the blade component and machining is performed while a tool is relatively moving about the longitudinal axis direction of the blade component. Generally, a machining program for such removal machining is produced targeted for a solid body of the blade component by means of a surface of the solid body.

Generally, in a machine tool, a tool and a workpiece are provided so as to linearly move relative to each other along two linear movement axes which are X-axis and Y-axis directions perpendicular to each other. For example, in the case of a machine tool 10 shown in FIGS. 6 and 7, an X-axis table 102 that linearly moves in the X-axis direction and a Y-axis table 103 that linearly moves in the Y-axis direction perpendicular to the X-axis direction are provided on a base 101. A rotary table 104 having a rotation axis 105 that rotates a held workpiece W about a C-axis is provided on the X-axis table 102. The rotary table 104 rotates the rotation axis 105 holding the workpiece W about an A-axis, thereby inclining the rotation axis 105 itself. The A-axis is set parallel with the Y-axis direction. Further, a column 106 stands on an upper surface of the base 101. A main axis unit 107 that can move up and down in a Z-axis direction is provided at an upper end portion of the column 106. A tool T is attached to a lower end portion of the main axis unit 107. For example, one described in Patent Document 1 has been known as such a machine tool.

Patent Document 1: Japanese Unexamined Patent Application, Publication No. 2016-36869

DISCLOSURE OF THE INVENTION

Problems to be Solved by the Invention

In machining of the blade component by the cutting machine, in the case of machining the curved surface by removal machining along the direction of the curvature of the curved surface, the tool T and the workpiece W are linearly moved relative to each other in the direction of the curvature of the curved surface along one of the two linear movement axes, i.e., the X- and Y-axis directions, perpendicular to each other while the workpiece W is rotating about a longitudinal axis (C-axis) of the blade component by the rotation axis 105. The direction of the curvature of the curved surface indicates a direction along a direction in which the curved surface is curved. Generally, in the case of the blade component, the direction of the curvature of the curved surface is a width direction of the blade surface.

However, in the case of machining the curved surface from the workpiece W by removal machining as described above, e.g., vibration due to acceleration and deceleration when the workpiece W is linearly moved influences the quality of the machined curved surface in some cases. That is, in the case of machining the curved surface from the workpiece W by removal machining along the direction of the curvature of the curved surface as shown in FIG. 7, the workpiece W needs to be linearly moved relative to the tool T in the Y-axis direction while rotating about the C-axis by the rotation axis 105. In this case, the Y-axis table 103 moves all the X-axis table 102, the rotary table 104, and the rotation axis 105. For this reason, the inertia moment (inertia) of the Y-axis table 103 is great, and a load on a Y-axis motor (not shown) that drives the Y-axis table 103 is great. As a result, in machining of the workpiece W, vibration is easily caused due to acceleration and deceleration when the Y-axis table 103 is linearly moved. For this reason, in machining of the curved surface from the workpiece by removal machining, a machining speed needs to be decreased in order to avoid influence of vibration on the quality of the machined curved surface.

Thus, there has been a demand for improvement of the quality of the machined curved surface without the need for decreasing the machining speed when the curved surface is machined from the workpiece by removal machining.

Means for Solving the Problems

A workpiece machining method according to one aspect of the present disclosure is a workpiece machining method for machining at least one curved surface selected from a convex surface or a concave surface from a workpiece by removal machining by moving a rotary table on which the workpiece is mounted and a tool relative to each other along two linear movement axes perpendicular to each other and rotating the workpiece about each of first and second turning axes perpendicular to each other by the rotary table, the method including arranging the first turning axis parallel with a first linear movement axis having a relatively-smaller motor load upon linear movement among the two linear movement axes and arranging the second turning axis on a plane perpendicular to the first linear movement axis and machining the curved surface along the direction of the curvature of the curved surface by removal machining while moving the workpiece along the first linear movement axis and rotating the workpiece about the second turning axis.

Effects of the Invention

According to one aspect, the quality of the machined curved surface can be improved without the need for decreasing the machining speed when the curved surface is machined from the workpiece by removal machining.

PREFERRED MODE FOR CARRYING OUT THE INVENTION

Figure 1:
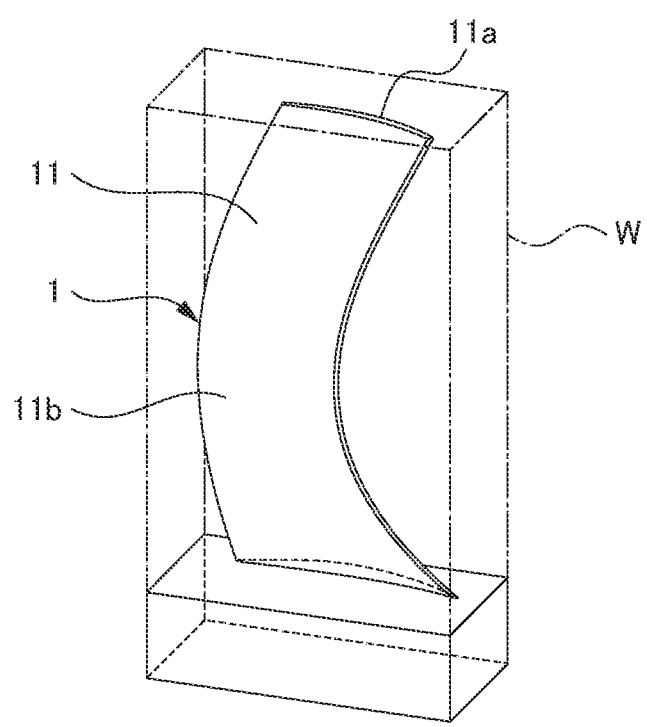
FIG. 1 is a perspective view showing a blade component machined from a workpiece by removal machining.

Hereinafter, one aspect of the present disclosure will be described in detail with reference to the drawings. FIG. 1 is a perspective view showing a blade component machined from a workpiece by removal machining. The blade component 1 is formed in such a manner that an unnecessary portion is removed from the rectangular parallelepiped workpiece W by a tool (not shown in FIG. 1) of a machine tool. The blade component 1 has, at least at one of front and back surfaces thereof, a blade surface 11 formed as a curved surface. Of the blade component 1 shown in FIG. 1, one blade surface 11 of the front and back surfaces is a convex surface 11a, and the other blade surface 11 is a concave surface 11b. Such a blade component 1 is, for example, a turbine blade or a compressor blade.

Figure 2:
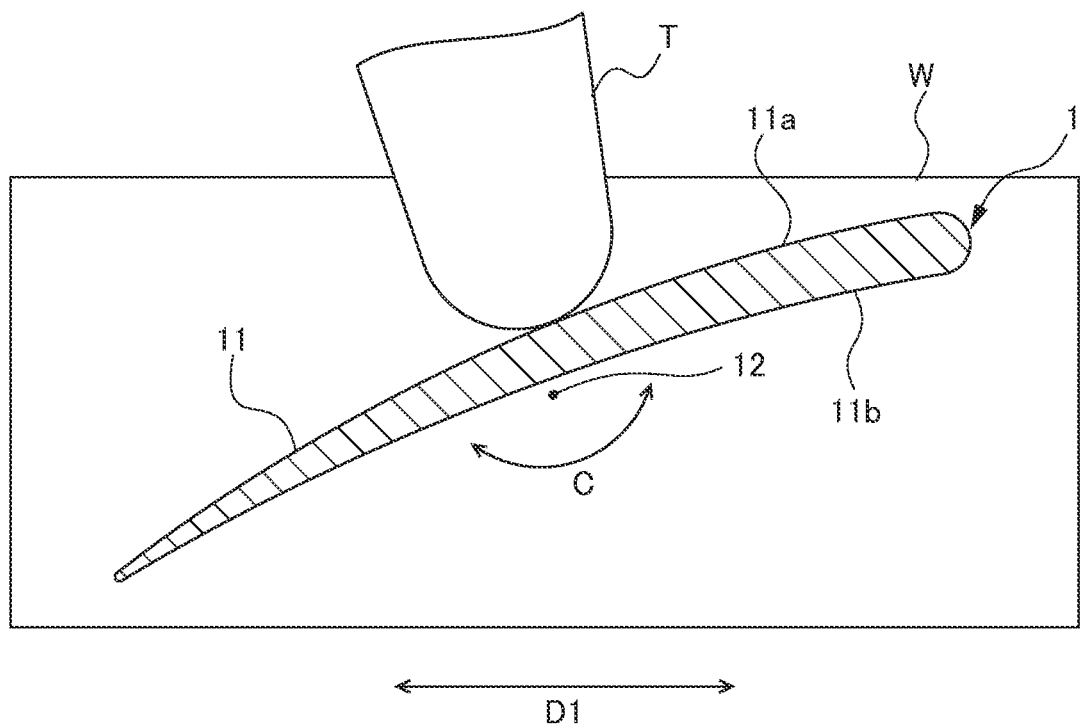
FIG. 2 is a sectional view showing a relationship between a blade surface and a tip end of a tool when the blade component is machined from the workpiece by removal machining.
Figure 3:
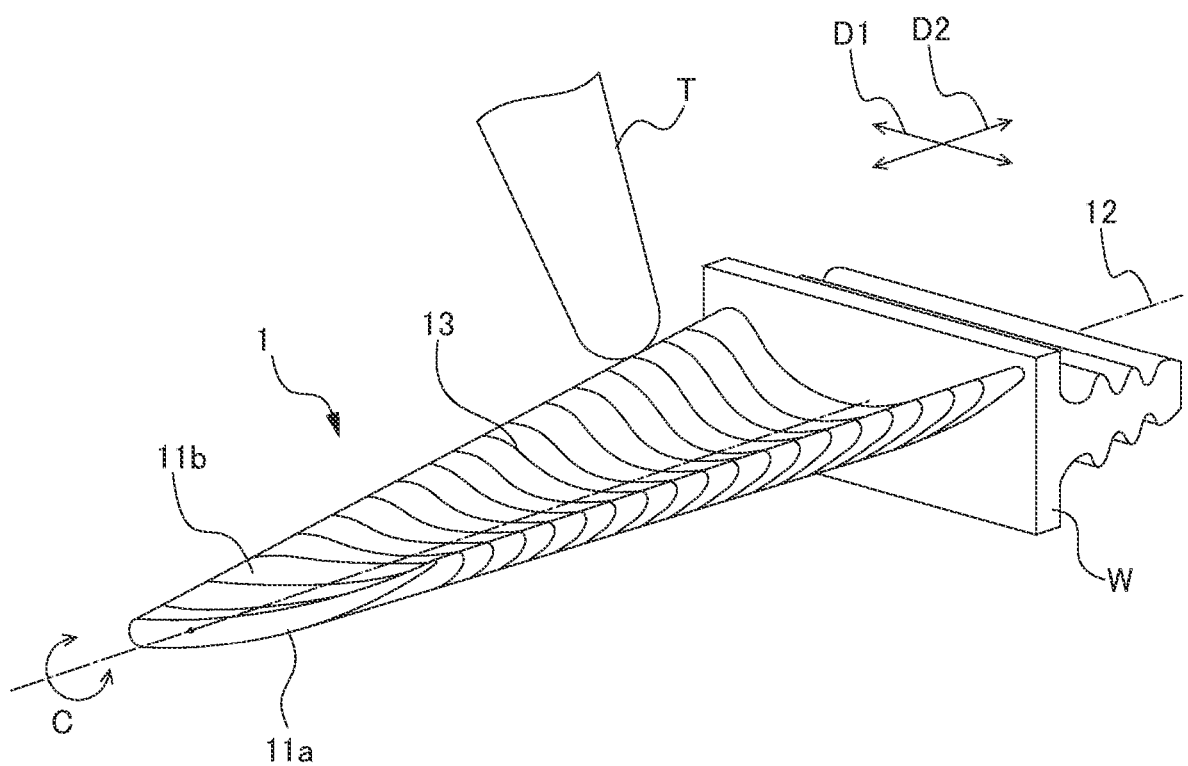
FIG. 3 is a perspective view showing the relationship between the blade surface and the tip end of the tool when the blade component is machined from the workpiece by removal machining.

FIGS. 2 and 3 show a positional relationship between the blade surface 11 and a tip end of the tool T when the blade component 1 is machined from the workpiece W by removal machining. As shown in FIG. 2, the tool T of the machine tool is positioned on an outer circumference of a machined shape in a section perpendicular to the direction (a direction perpendicular to the plane of paper of FIG. 2) of a longitudinal axis 12 of the blade component 1.

In the case of machining the blade surface 11 by removal machining by the tool T, the workpiece W is rotated about the longitudinal axis 12 while linearly moving along one direction (a D1 direction) such that machining trajectories 13 shown in FIG. 3 are along the direction (an outer circumferential direction of the machined shape shown in the section of FIG. 2) of the curvature of the blade surface 11. Further, the workpiece W is linearly moved in the direction (a D2 direction) of the longitudinal axis 12 by a predetermined distance such that the tool T is sequentially moved from one to another machining trajectory 13. In this manner, the blade component 1 is machined from the workpiece W by removal machining. In one aspect of the present disclosure, a linear movement axis when the workpiece W is linearly moved along the direction (the D1 direction) of the curvature of the blade surface 11 as described above is set to an axis (hereinafter referred to as a first linear movement axis) with a relatively-smaller motor load among two linear movement axes which are an X-axis direction and a Y-axis direction perpendicular to each other.

Figure 4:
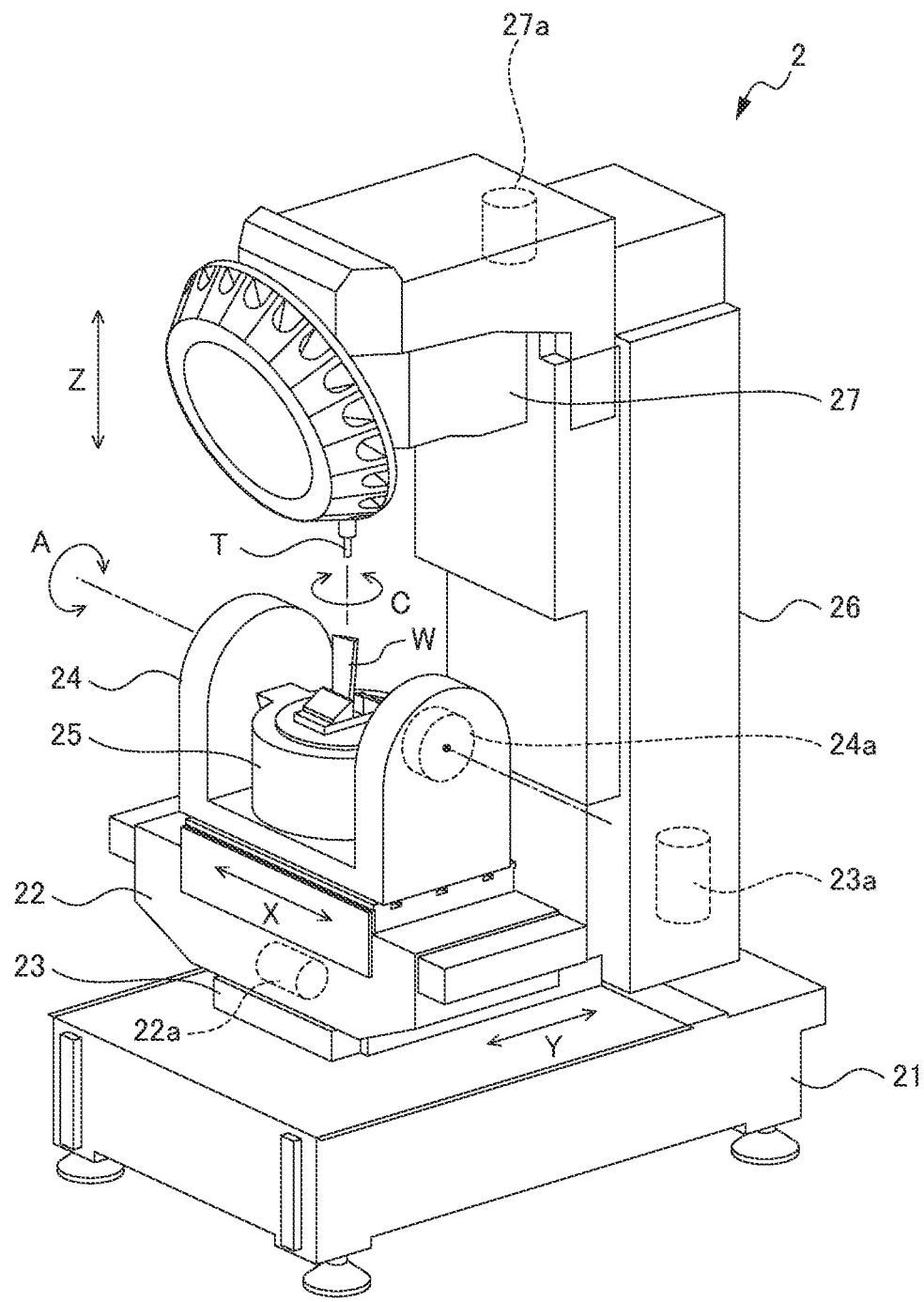
FIG. 4 is a perspective view showing one embodiment of a machine tool used for a workpiece machining method according to one aspect of the present disclosure.
Figure 5:
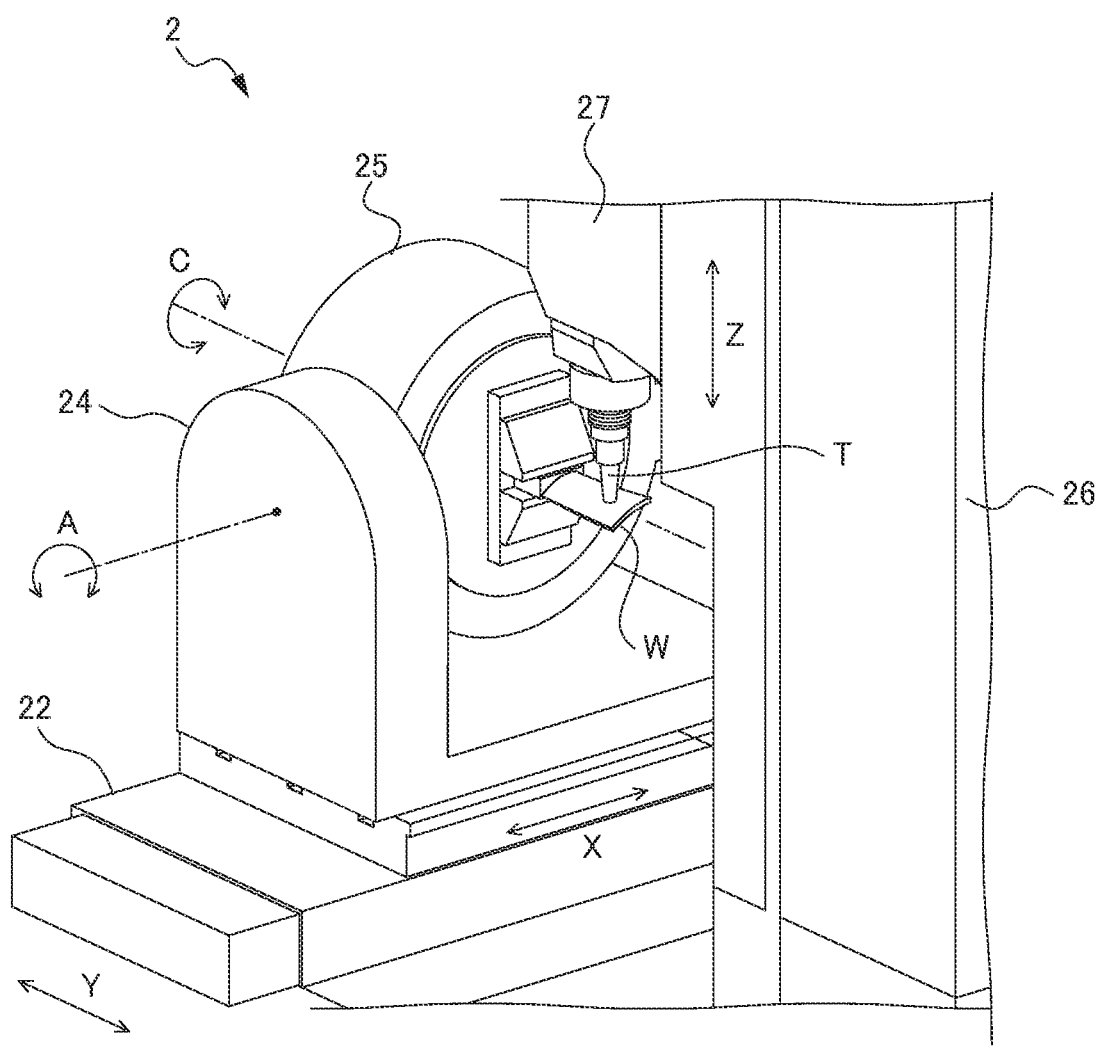
FIG. 5 is a perspective view showing, in closeup, a state in which the blade surface of the blade component is machined by removal machining by the machine tool shown in FIG. 4.
Figure 6:
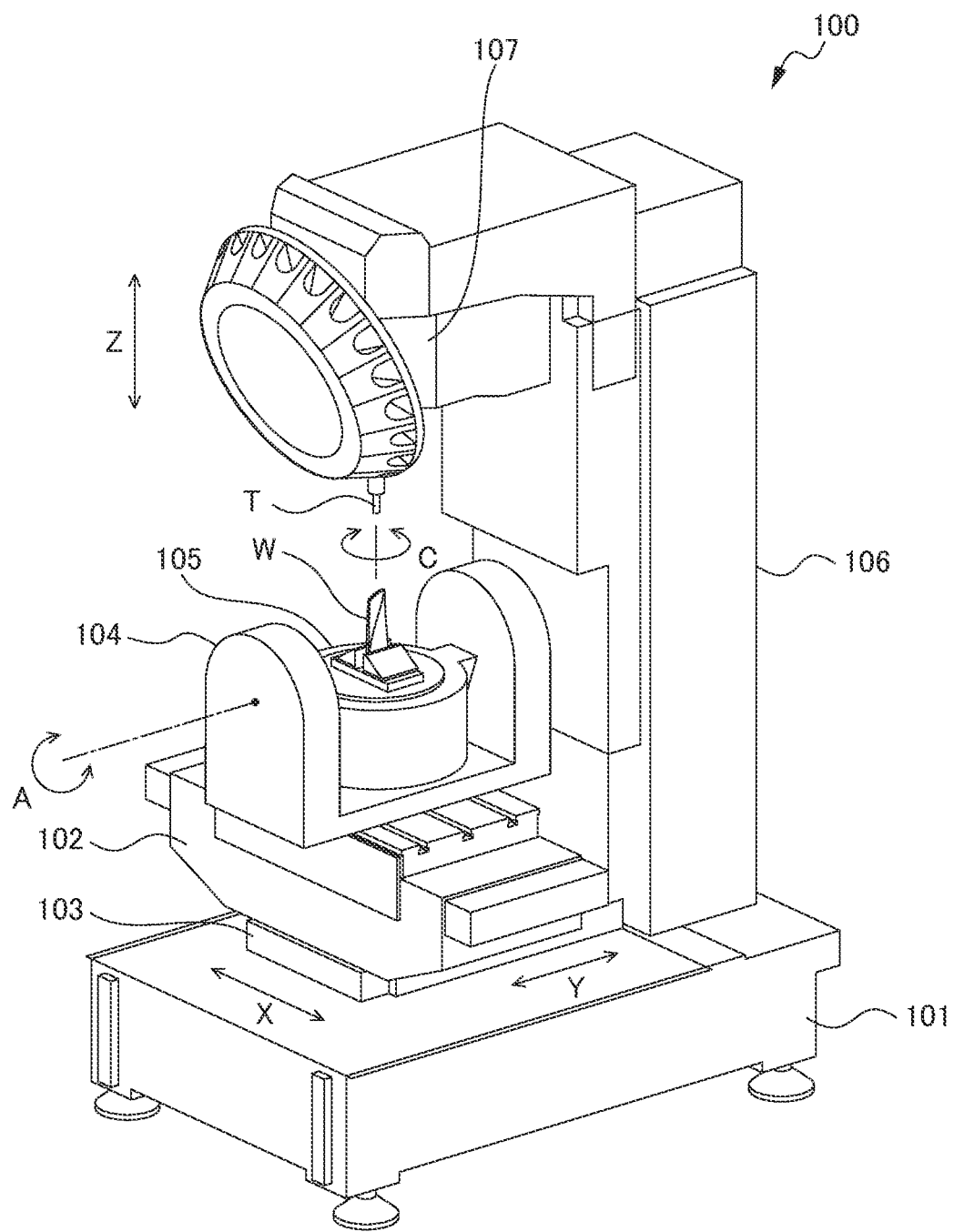
FIG. 6 is a perspective view showing one example of a machine tool used for a typical workpiece machining method.
Figure 7:
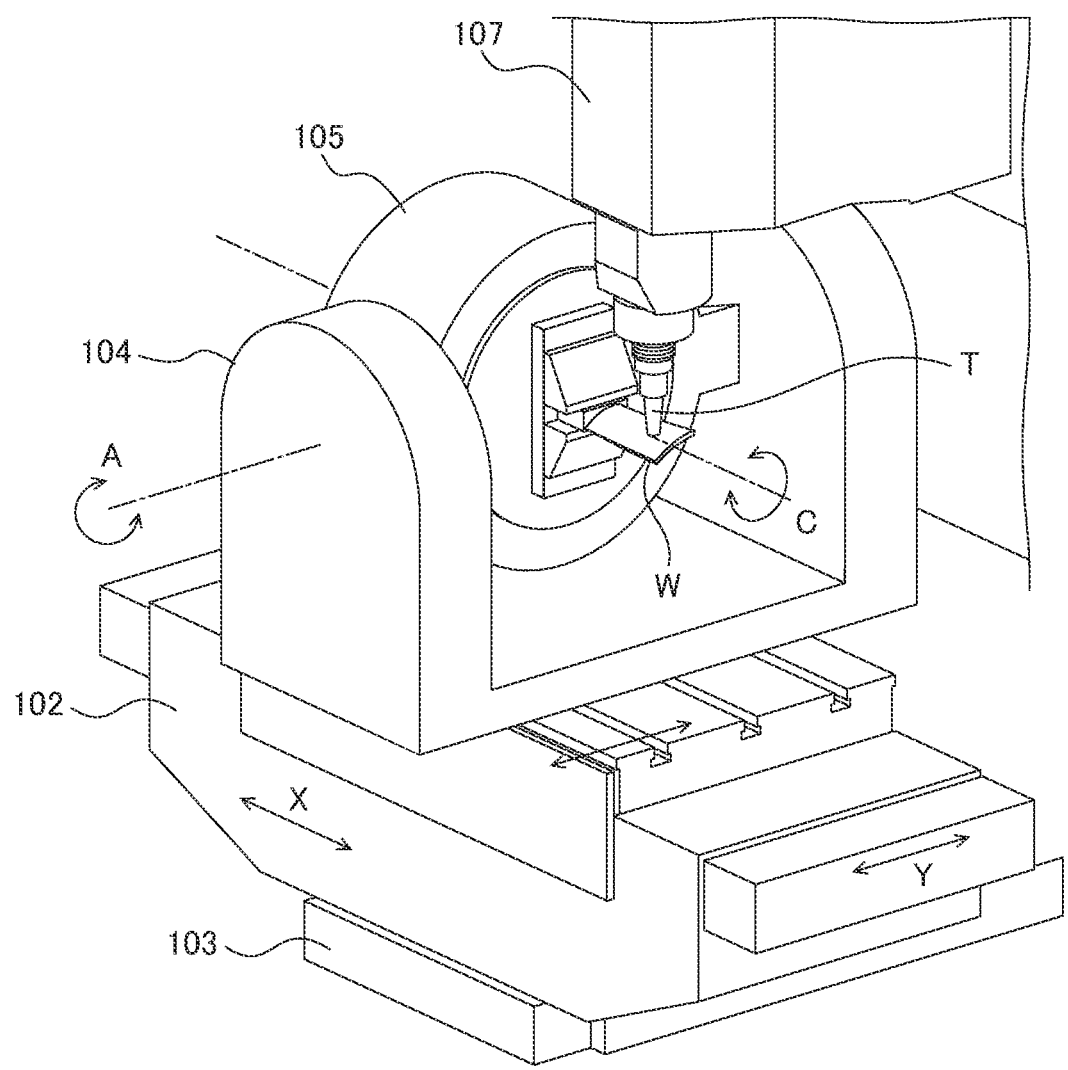
FIG. 7 is a perspective view showing, in closeup, a state in which a blade surface of a blade component is machined by removal machining by the machine tool shown in FIG. 6.

Next, a specific workpiece machining method for machining the blade component 1 from the workpiece W by removal machining by means of the machine tool 2 as a cutting machine shown in FIGS. 4 and 5 will be further described. FIG. 4 is a perspective view showing one embodiment of the machine tool used for the workpiece machining method according to one aspect of the present disclosure. FIG. 5 is a perspective view showing, in closeup, a state in which the blade surface of the blade component is machined by removal machining by the machine tool shown in FIG. 4.

The machine tool 2 includes, on a base 21 placed on a floor, an X-axis table 22 that linearly moves in the X-axis direction and a Y-axis table 23 that linearly moves in the Y-axis direction perpendicular to the X-axis direction. The X-axis table 22 is provided so as to linearly move in the X-axis direction by drive of an X-axis motor 22a. The Y-axis table 23 is provided so as to linearly move in the Y-axis direction by drive of a Y-axis motor 23a.

A rotary table 24 is mounted on an upper surface of the X-axis table 22. The rotary table 24 rotatably supports a rotation axis 25. The rotation axis 25 is a member that holds the workpiece W, and rotates the held workpiece W about a C-axis (a second turning axis). The workpiece W is attached to the rotation axis 25 such that the direction (the D2 direction) of the longitudinal axis 12 of the machined blade component 1 is parallel with the direction of the C-axis.

The rotary table 24 rotates (inclines) the rotation axis 25 itself about an A-axis (a first turning axis) by drive of an A-axis motor 24a. The A-axis of the rotary table 24 is arranged parallel with the X-axis direction. The C-axis of the rotation axis 25 is arranged on a plane perpendicular to the X-axis direction. Thus, the A-axis of the rotary table 24 serves as an inclination axis about which the C-axis of the rotation axis 25 is inclined along the plane perpendicular to the A-axis.

A column 26 stands on an upper surface of the base 21. A main axis unit 27 that can move up and down along a Z-axis direction perpendicular to the X-axis direction and the Y-axis direction by drive of a Z-axis motor 27a is provided at an upper end portion of the column 26. The tool T is attached to a lower end portion of the main axis unit 27.

In the machine tool 2, the direction of the A-axis is arranged parallel with the X-axis direction of the X-axis and Y-axis directions perpendicular to each other. The A-axis is the first turning axis. The X-axis table 22 has only to move the rotary table 24 and the rotation axis 25 upon linear movement in the X-axis direction, and therefore, has a relatively-smaller inertia moment (inertia) than that of the Y-axis table 23. Thus, a load on the X-axis motor 22a that drives the X-axis table 22 is smaller than a load on the Y-axis motor 23a that drives the Y-axis table 23. Consequently, in the machine tool 2, the X-axis of the X- and Y-axes perpendicular to each other serves as the first linear movement axis with a relatively-smaller motor load.

In the case of machining the blade surface 11 of the blade component 1 from the workpiece W by removal machining, the tool T and the workpiece W are, in the machine tool 2, linearly moved relative to each other in the direction (the D1 direction) of the curvature of the blade surface 11 while the workpiece W is rotating about the C-axis, as shown in FIGS. 2 and 3. The C-axis is the second turning axis. The axis of relative linear movement of the tool T and the workpiece W at this point is set to the X-axis. The X-axis is the linear movement axis of the X-axis table 22 with a relatively-smaller inertia moment (inertia) than that of the Y-axis table 23. Thus, vibration generated by acceleration and deceleration when the tool T and the workpiece W are linearly moved relative to each other in the direction (the D1 direction) of the curvature of the blade surface 11 by the X-axis table 22 is smaller than that when the Y-axis table 23 is linearly moved. As a result, influence of vibration upon linear movement on the quality of the machined curved surface is reduced. Thus, according to this workpiece machining method, the quality of the machined curved surface of the blade component 1 can be improved without the need for decreasing a machining speed.

In the above-described embodiment, the X-axis table 22 of the machine tool 2 is mounted on the Y-axis table 23, but the machine tool used for the workpiece machining method of the present disclosure is not limited to such a configuration. Various configurations can be employed for the X-axis and the Y-axis along which the workpiece W is linearly moved in the directions perpendicular to each other in the machine tool. For example, the X-axis table 22 may be mounted on the base 21, and the column 26 may be linearly movable in the Y-axis direction on the base 21. In this case, the X-axis table 22 that linearly moves in the X-axis direction also has a smaller inertia moment (inertia) than that of the column 26 that linearly moves in the Y-axis direction, and therefore, has a smaller motor load.

EXPLANATION OF REFERENCE NUMERALS

1 Blade Component
11 Blade Surface
11*a* Convex Surface
11*b* Concave Surface
24 Rotary Table
25 Rotation Axis
A First Turning Axis
C Second Turning Axis
T Tool
W Workpiece
X Linear Movement Axis (First Linear Movement Axis)
Y Linear Movement Axis

The invention claimed is:

1. A workpiece machining method for machining at least one curved surface selected from a convex surface or a concave surface from a workpiece by removal machining by moving a rotary table on which the workpiece is mounted and a tool relative to each other along two linear movement axes perpendicular to each other and rotating the workpiece about each of first and second turning axes perpendicular to each other by the rotary table, comprising:

arranging the first turning axis parallel with a first linear movement axis having a relatively-smaller motor load upon linear movement among the two linear movement axes and arranging the second turning axis on a plane perpendicular to the first linear movement axis; and machining the curved surface along a direction of a curvature of the curved surface by removal machining while moving the workpiece along the first linear movement axis and rotating the workpiece about the second turning axis.

2. The workpiece machining method according to claim 1, wherein the first turning axis is an inclination axis about which the second turning axis is inclined along a plane perpendicular to the first turning axis, and the second turning axis is a rotation axis about which the workpiece is rotated.

3. The workpiece machining method according to claim 1, wherein the curved surface is a blade surface of a blade component.

4. The workpiece machining method according to claim 1, wherein the two linear movement axes include the first linear movement axis and a second linear movement axis, and the rotary table is configured to move, together with the first linear movement axis, along the second linear movement axis in a direction perpendicular to the first linear movement axis.

5. The workpiece machining method according to claim 1, wherein the workpiece is mounted on the rotary table so that the direction of the curvature of the curved surface of the workpiece is arranged in parallel with the first linear movement axis.

* * * * *